United States Patent
Nakamura et al.

(10) Patent No.: US 10,994,602 B2
(45) Date of Patent: *May 4, 2021

(54) DUCT ASSEMBLY FOR VEHICLE

(71) Applicant: TOYOTA JIDOSHA KABUSHIKI KAISHA, Toyota (JP)

(72) Inventors: Koichi Nakamura, Miyoshi (JP); Tomoaki Furukawa, Toyota (JP); Kiyonori Takagi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,457

(22) Filed: Jul. 30, 2019

(65) Prior Publication Data

US 2020/0062107 A1 Feb. 27, 2020

(30) Foreign Application Priority Data

Aug. 27, 2018 (JP) .............................. JP2018-158115

(51) Int. Cl.
*B60K 1/00* (2006.01)
*B60K 11/08* (2006.01)
*B60K 11/06* (2006.01)

(52) U.S. Cl.
CPC ................ *B60K 11/08* (2013.01); *B60K 1/00* (2013.01); *B60K 11/06* (2013.01); *B60K 2001/003* (2013.01)

(58) Field of Classification Search
CPC ........ B60K 11/06; B60K 11/08; B60K 13/02; B60K 11/00
See application file for complete search history.

(56) References Cited

U.S. PATENT DOCUMENTS

| 2,194,394 | A | * | 3/1940 | Klavik | ................... | B60K 11/08 |
| | | | | | | 180/68.1 |
| 7,270,206 | B2 | * | 9/2007 | Guertler | ................. | B60K 11/06 |
| | | | | | | 180/68.1 |
| 9,490,459 | B2 | * | 11/2016 | Takizawa | ............ | H01M 2/1083 |
| 9,669,703 | B2 | * | 6/2017 | Kosaki | .................. | B60K 11/00 |
| 9,873,456 | B2 | * | 1/2018 | Hara | .................. | B62D 25/2072 |
| 10,377,228 | B2 | * | 8/2019 | Kondo | .................... | B60K 11/08 |

(Continued)

FOREIGN PATENT DOCUMENTS

JP 2006-103365 A 4/2006

OTHER PUBLICATIONS

Oct. 28, 2020 Notice of Allowance issued in U.S. Appl. No. 16/526,151.

(Continued)

*Primary Examiner* — Hau V Phan
(74) *Attorney, Agent, or Firm* — Oliff PLC

(57) ABSTRACT

A duct assembly for a vehicle includes an intake duct configured to supply air to an object to be cooled and a discharge duct configured to discharge the air supplied to the object to be cooled to the outside of the vehicle. The discharge duct has a discharge port that opens downward. The intake duct has an intake port that opens rearward. The rear bumper has a depression and an upper wall section. The depression has a panel opening that allows passage of air supplied to the intake port. The depression is recessed from the upper wall section toward the front of the vehicle.

8 Claims, 2 Drawing Sheets

(56) References Cited

U.S. PATENT DOCUMENTS

| | | | |
|---|---|---|---|
| 10,578,003 B2 | 3/2020 | Kinomoto et al. | |
| 2003/0037983 A1* | 2/2003 | Hanaya | B60K 13/04 180/309 |
| 2004/0231898 A1* | 11/2004 | Hochkoenig | B62D 35/02 180/68.1 |
| 2009/0317692 A1* | 12/2009 | Matsumoto | B60K 11/06 429/415 |
| 2013/0168167 A1* | 7/2013 | Matsumoto | B60K 13/02 180/65.31 |
| 2017/0267094 A1* | 9/2017 | Pfeiffer | B60K 11/08 |
| 2018/0257482 A1 | 9/2018 | Kondo et al. | |
| 2019/0233026 A1 | 8/2019 | Nakamura et al. | |
| 2020/0063639 A1 | 2/2020 | Nakamura et al. | |

OTHER PUBLICATIONS

Apr. 22, 2020 Office Action issued in U.S. Appl. No. 16/526,151.
Sep. 2, 2020 Notice of Allowance issued in U.S. Appl. No. 16/526,121.

* cited by examiner

DUCT ASSEMBLY FOR VEHICLE

BACKGROUND

1. Field

The present disclosure relates to a duct assembly for a vehicle.

2. Description of Related Art

Japanese Laid-Open Patent Publication No. 2006-103365 discloses an electric vehicle equipped with a power unit that supplies electric power to a driving motor for driving the vehicle. The electric vehicle described in the above-mentioned publication includes an intake duct for supplying air outside the vehicle to the power unit and a discharge duct for discharging the air supplied to the power unit to the outside of the vehicle. The floor panel has a discharge port of the discharge duct, and the discharge port opens downward from the vehicle. The rear wheel well liner, which covers the rear wheel from above, has an intake port of the intake duct. The intake port opens toward the rear wheel.

The electric vehicle described above has an opening for supplying air to the intake port of the intake duct. Depending on the position of the opening, foreign matter may enter the intake duct through the opening. If a large amount of foreign matter enters the path of air, foreign matter may accumulate on an object to be cooled located downstream of the intake duct. The object to be cooled thus may be difficult to cool.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a duct assembly for a vehicle is provided. The vehicle includes a floor panel, two rear wheels, an outer panel that constitutes an outer surface of the vehicle and has a rear bumper located rearward of the two rear wheels, and an object to be cooled arranged below the floor panel. The duct assembly includes an intake duct and a discharge duct. The intake duct is configured to supply air outside the vehicle to the object to be cooled. The discharge duct is configured to discharge the air supplied to the object to be cooled to an outside of the vehicle. The discharge duct has a discharge port that opens downward. The intake duct has an intake port that opens to behind the vehicle. The rear bumper has a depression and an upper wall section that is above and adjacent to the depression. The depression has a panel opening that allows passage of the air supplied to the intake port. The depression is recessed from the upper wall section toward a front of the vehicle.

In anther general aspect, a duct assembly for a vehicle is provided. The vehicle includes a floor panel, two rear wheels, a rear outer panel portion that is located rearward of the two rear wheels and constitutes a part of an outer surface of the vehicle, and an object to be cooled arranged below the floor panel. The duct assembly includes an intake duct, a discharge duct, and a depression. The intake duct is configured to supply air outside the vehicle to the object to be cooled. The intake duct has an intake port that opens rearward. The discharge duct is configured to discharge the air supplied to the object to be cooled to an outside of the vehicle. The discharge duct has a discharge port that opens downward. The depression is provided in the rear outer panel portion. The depression has a panel opening that allows passage of air supplied to the intake port. The rear outer panel portion has an upper wall section that is above and adjacent to the depression. The depression is recessed forward from the upper wall section.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Figure 1:
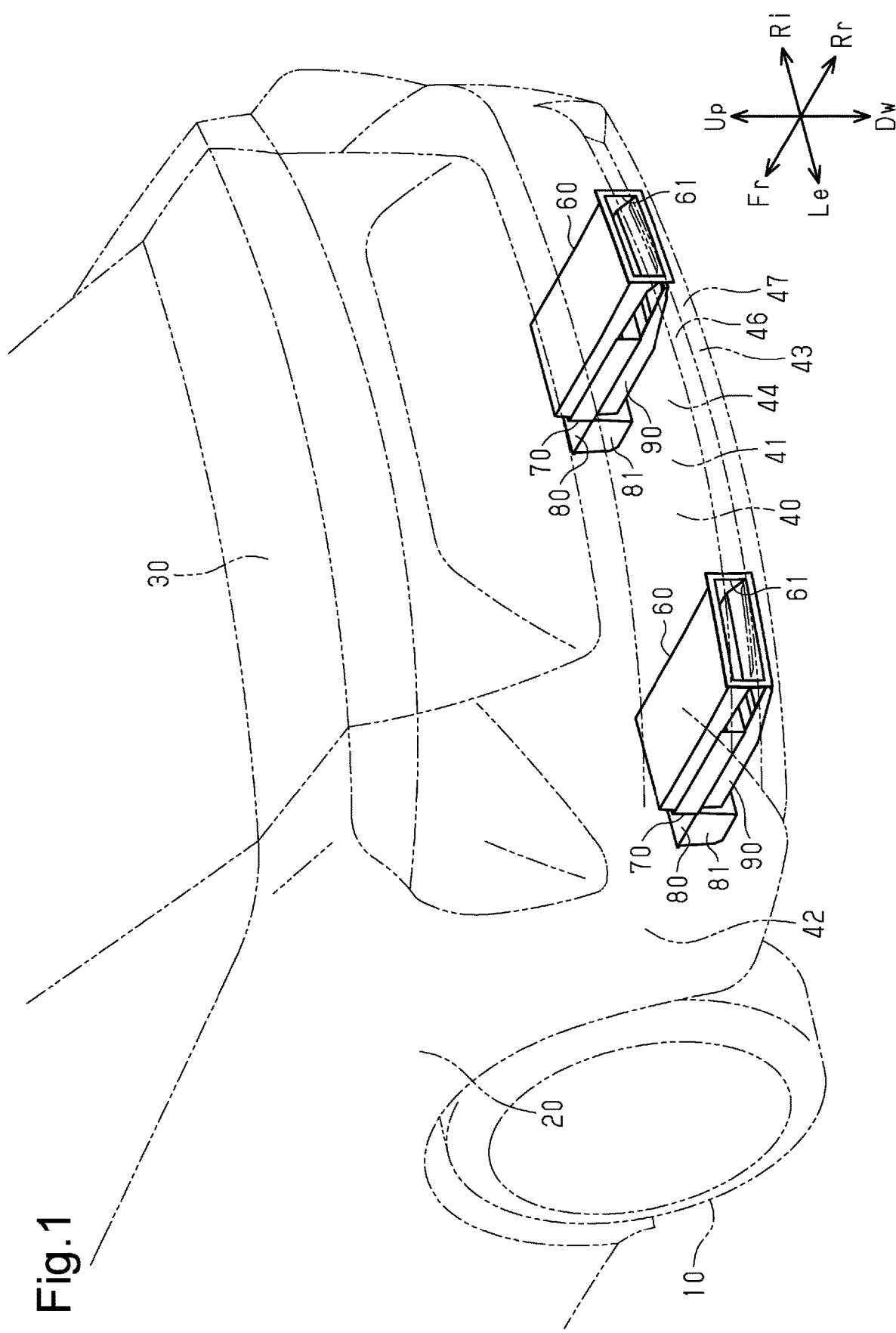
FIG. 1 is a perspective view showing the lower structure of a vehicle.
Figure 2:
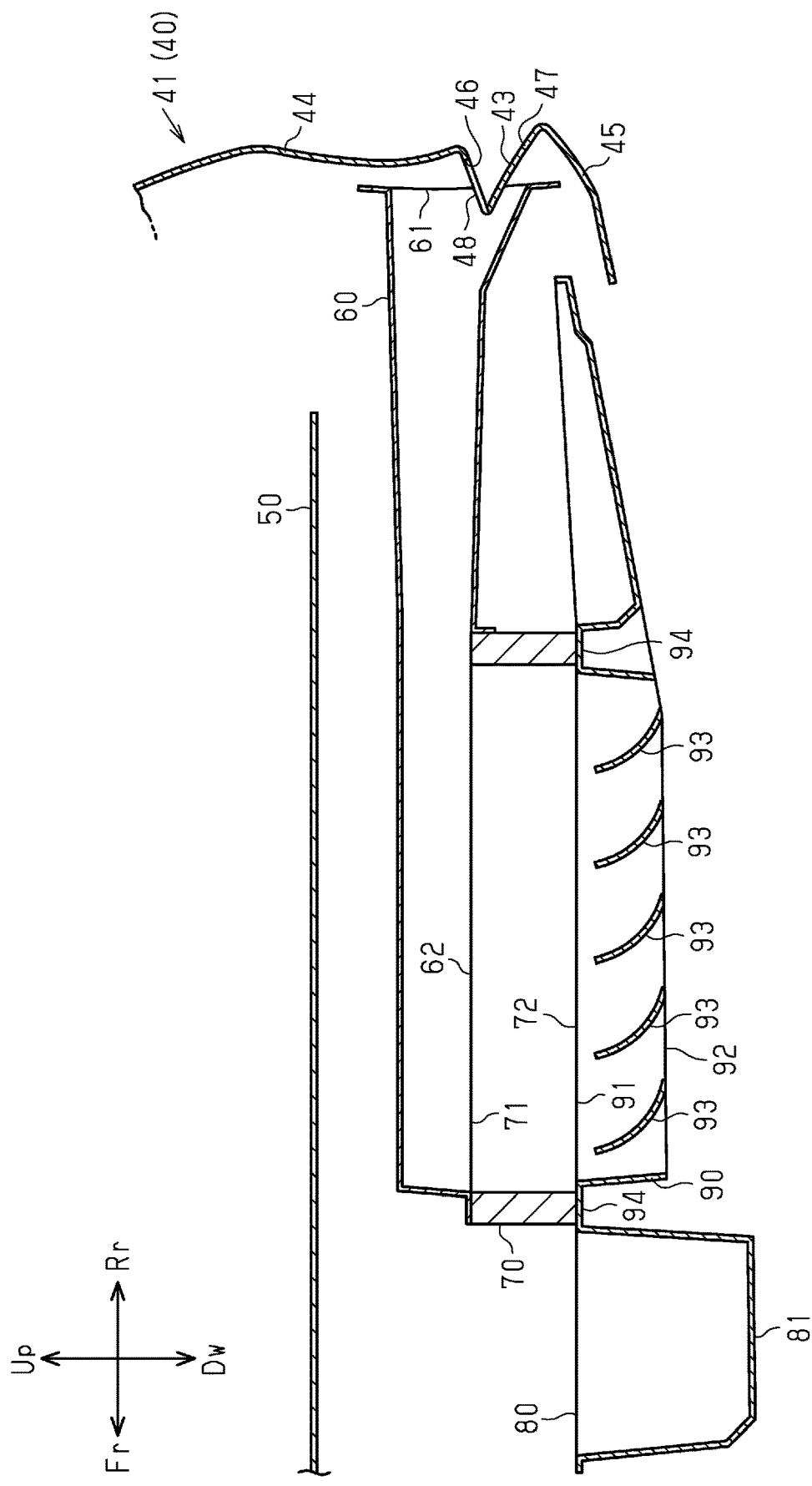
FIG. 2 is a cross-sectional view showing a duct assembly for a vehicle.

A duct assembly for a vehicle according to an embodiment will now be described with reference to the drawings. In FIGS. 1 and 2, the arrow Up indicates the upper side of the vehicle, the arrow Dw indicates the lower side of the vehicle, the arrow Fr indicates the front side of the vehicle, and the arrow Rr indicates the rear side of the vehicle. In FIG. 1, the arrow Le indicates the left direction in the vehicle width direction when the vehicle faces forward, and the arrow Ri indicates the right direction in the vehicle width direction when the vehicle faces forward. Thus, the front side, rear side, upper side, lower side, right side, and left side of the present disclosure are defined with reference to the vehicle with the duct assembly.

As shown in FIG. 1, the vehicle has an outer panel that constitutes the outer surface of the vehicle, and the outer panel includes two rear fender panels 20, a trunk panel 30, and a rear bumper 40. The two rear fender panels 20 are respectively sections above the two rear wheels 10. The rear fender panels 20 are also referred to as rear quarter panels. The trunk panel 30 is located rearward of and between the two rear fender panels 20 on the left and right. The trunk panel 30 is also referred to as an upper back panel. The rear bumper 40 is a section below the trunk panel 30 and is also referred to as a back panel or a rear spoiler.

The rear bumper 40 includes a rear wall 41 extending over the entire width of the vehicle and two side walls 42. The rear wall 41 constitutes the rear end face of the vehicle. As shown in FIG. 2, the rear wall 41 includes an upper wall section 44, which extends substantially in the vertical direction. The rear wall 41 also includes a lower wall section 45, which is curved forward toward the lower end. As shown in FIG. 1, the two side walls 42 extend forward from the opposite edges of the rear wall 41 in the vehicle width direction. The front edge of each side wall 42 has a shape that is recessed in a circular arc toward the rear. The upper edges of the two side walls 42 are respectively connected to the lower edges at the rear of the left and right rear fender panels 20. In FIG. 1, the outline of the vehicle is indicated by the long dashed double-short dashed lines.

As shown in FIGS. 1 and 2, the rear wall 41 of the rear bumper 40 has a depression 43, which is recessed forward. The depression 43 is located between the upper wall section 44 and the lower wall section 45 in the vertical direction. The depression 43 is a groove extending substantially over the entire rear wall 41 in the vehicle width direction. That is, the depression 43 is recessed forward with respect to the upper wall section 44, which is above and adjacent to the depression 43 and with respect to the lower wall section 45, which is below and adjacent to the depression 43.

As shown in FIG. 2, when the cross-sectional shape of the depression 43 is viewed in the vehicle width direction, the vertical dimension of the depression 43 decreases toward the front end. Specifically, the depression 43 has an upper inclined portion 46, which is inclined downward toward the front end, and a lower inclined portion 47, which is inclined upward toward the front end. The front edge of the upper inclined portion 46 is coupled to the front edge of the lower inclined portion 47.

The vehicle includes a substantially plate-shaped rear floor panel 50 at the front side of the rear bumper 40. The rear floor panel 50 is located at the bottom of the rear of the vehicle. The rear floor panel 50 constitutes the floor surface on the rear rear side of the rear wheel 10 (for example, the trunk).

As shown in FIGS. 1 and 2, two intake ducts 60, into which air flows from the outside of the vehicle, are arranged below the rear floor panel 50. The two intake ducts 60 are arranged away from each other and each located between the center and one of the opposite ends in the vehicle width direction. Each intake duct 60 has a flat, substantially rectangular box shape of which the dimension in the vehicle width direction is longer than the dimension in the vertical direction. The intake ducts 60 extend in the front-rear direction along the lower surface of the rear floor panel 50. The upper surface of each intake duct 60 is fixed to the lower surface of the rear floor panel 50, for example, with bolts via a bracket (not shown).

Each intake duct 60 has an intake port 61, which is located at the rear end face and opens to the outside of the vehicle. The intake port 61 has a substantially rectangular shape. That is, the intake port 61 opens rearward. Also, as shown in FIG. 2, the intake duct 60 has an outlet 62 at the front of the lower surface. The outlet 62 is opened toward the inside of the vehicle. The outlet 62 has a substantially rectangular shape.

As shown in FIGS. 1 and 2, an air-cooled oil cooler 70, which is an object to be cooled, is fixed to the lower surface of each intake duct 60. That is, the two oil coolers 70 are mounted below the rear floor panel 50 of the vehicle so as to respectively correspond to the two intake ducts 60. Each oil cooler 70 has a flat and rectangular box outer shape of which the dimension in the vehicle width direction is longer than the dimension in the vertical direction. In the present embodiment, the dimension in the vehicle width direction of each oil cooler 70 is substantially the same as the dimension in the vehicle width direction of the corresponding intake duct 60. Each oil cooler 70 extends in the front-rear direction along the lower surface of the corresponding intake duct 60. The dimension in the front-rear direction of each oil cooler 70 is shorter than the dimension in the front-rear direction of the corresponding intake duct 60.

As shown in FIG. 2, each oil cooler 70 has an upstream-side opening 71 in the upper surface. The upstream-side opening 71 is continuous with the inside of the oil cooler 70. The upstream-side opening 71 has a substantially rectangular shape extending substantially over the entire upper surface of the oil cooler 70. The position at which each oil cooler 70 is fixed to the lower surface of the corresponding intake duct 60 is determined such that the upstream-side opening 71 faces the outlet 62 of the corresponding intake duct 60. In the present embodiment, each oil cooler 70 is arranged such that its front end is substantially at the same position as the front end of the corresponding intake duct 60 in the front-rear direction.

The inside of each oil cooler 70 is continuous with the inside of the corresponding intake duct 60 via the upstream-side opening 71. Each oil cooler 70 also has a downstream-side opening 72 in the lower surface. The downstream-side opening 72 has a substantially rectangular shape extending substantially over the entire lower surface of the oil cooler 70.

Oil passages (not shown) are arranged inside each oil cooler 70. Each oil passage is supplied with, for example, oil warmed by the driving motor for driving the rear wheels 10. The oil cooled through heat exchange in these oil passages is again supplied to the driving motor to cool the driving motor.

As shown in FIGS. 1 and 2, a lower cover 80 is disposed on the lower surface of each oil cooler 70 so as to face the rear floor panel 50. That is, the two lower covers 80 respectively correspond to the two oil coolers 70. The rear of each lower cover 80 constitutes a discharge duct 90. The discharge duct 90 has a shape like a plate curved to project downward as a whole and has a flat rectangular box shape of which the dimension in the vehicle width direction is longer than the dimension in the vertical direction. In the present embodiment, the dimension in the vehicle width direction of each discharge duct 90 is substantially the same as the dimension in the vehicle width direction of the corresponding oil cooler 70. As shown in FIG. 1, the discharge duct 90 extends in the front-rear direction along the lower surface of the oil cooler 70. The dimension in the front-rear direction of the discharge duct 90 is longer than the dimension in the front-rear direction of the oil cooler 70. Furthermore, as shown in FIG. 2, the dimension in the vertical direction of the discharge duct 90 decreases toward the rear end. The rear of the discharge duct 90 is located above the front end of the lower wall section 45. The rear end of the discharge duct 90 is located rearward of the front end of the lower wall section 45. That is, the rear end of the discharge duct 90 is covered from below by the lower wall section 45 of the rear bumper 40.

As shown in FIG. 2, almost the entire discharge duct 90 opens upward. A portion of the discharge duct 90 that opens toward the downstream-side opening 72 of the oil cooler 70 functions as an inlet 91 for introducing air into the discharge duct 90. In the present embodiment, the position of the discharge duct 90 is determined such that the front end of the discharge duct 90 is substantially at the same position as the front end of the oil cooler 70 in the front-rear direction.

The discharge duct 90 has a discharge port 92, which is located in the lower surface and opens to the outside of the vehicle. That is, the discharge port 92 opens downward. The discharge port 92 is located at the front of the discharge duct 90 and faces the inlet 91.

The lower wall of the discharge duct 90 has two recesses 94, which are recessed upward. The two recesses 94 are respectively arranged in the front-rear direction at positions corresponding to the front end and the rear end of the oil cooler 70. The bottom wall (upper wall) of each recess 94 is in contact with the lower surface of the oil cooler 70. The discharge duct 90 (lower cover 80) is fixed to the oil cooler 70 with bolts (not shown) that are inserted into the bottom wall (upper wall) of these recesses 94.

Each discharge duct 90 incorporates multiple plate-shaped fins 93. The fins 93 extend in the vehicle width direction, and the opposite edges in the vehicle width direction of the fins 93 are connected to the inner surfaces of the discharge duct 90 on the opposite sides in the vehicle width direction. The fins 93 are inclined such that the lower ends are located rearward of the upper ends. The fins 93 are curved such that the lower ends point rearward. The fins 93 are arranged between the inlet 91 and the discharge port 92 in the discharge duct 90. The fins 93 are arranged parallel with each other at equal intervals in the front-rear direction.

As shown in FIGS. 1 and 2, each lower cover 80 has a protrusion 81, which protrudes downward, at the front. The protrusion 81 has the shape of a substantially rectangular hollow box. The protrusion 81 is located forward of the front end of the discharge duct 90 in the front-rear direction. The dimension in the vehicle width direction of the protrusion 81 is substantially the same as the dimension in the vehicle width direction of the discharge duct 90. The position in the vehicle width direction of the protrusion 81 is the same as the position of the discharge duct 90. The lower end of the protrusion 81 is located below the discharge port 92 of the discharge duct 90.

As shown in FIG. 2, the upper inclined portion 46 of the depression 43 has two panel openings 48. The two panel openings 48 respectively correspond to the two intake ducts 60. The panel openings 48 extend through the upper inclined portion 46 in the thickness direction. Each panel opening 48 has a substantially rectangular shape in plan view. The lower end of each panel opening 48 is located at the boundary between the upper inclined portion 46 and the lower inclined portion 47, that is, at the front end of the depression 43. The two panel openings 48 are away from each other and each located between the center and one of the opposite ends in the vehicle width direction of the upper inclined portion 46.

The portion (rear end) of the intake duct 60 that is connected to the intake port 61 is inclined such that the dimension increases toward the intake port 61. Accordingly, the cross-sectional flow area of the intake duct 60 increases toward the intake port 61.

The opening area (cross-sectional flow area) of the intake port 61 is larger than the opening area (cross-sectional flow area) of the panel opening 48. Also, when viewed from behind, the entire area of the panel opening 48 is located inside the opening of the intake port 61.

The intake port 61 of the intake duct 60 covers the depression 43 of the rear bumper 40 from the front. In other words, the front part of the depression 43 is located inside the intake duct 60. As described above, the lower end of the panel opening 48 overlaps with the front end of the depression 43. Therefore, the lower part of the panel opening 48 is located forward of the intake port 61.

The operation of the above-described duct assembly for a vehicle will now be described.

When a vehicle equipped with the duct assembly of the above-described embodiment travels, an air flow of a corresponding speed from the front to the rear is generated below the lower cover 80. Therefore, the static pressure of the air in the area below the lower cover 80 is lower than that in the space behind the rear wall 41, which constitutes the rear end face of the vehicle. Therefore, in the above-described duct assembly, an air flow is generated from the panel opening 48 in the rear wall 41 of the rear bumper 40 toward the intake port 61 of the intake duct 60.

The air that has flowed into the intake duct 60 from the intake port 61 is supplied to the inside of the oil cooler 70 through the outlet 62 of the intake duct 60 and the upstream-side opening 71 of the oil cooler 70. The air supplied to the inside of the oil cooler 70 is warmed through heat exchange with the oil in the oil passages. The warmed air flows into the discharge duct 90 through the downstream-side opening 72 of the oil cooler 70 and the inlet 91 of the discharge duct 90. The air that has flowed in is discharged from the discharge port 92 of the discharge duct 90. Furthermore, the air discharged from the discharge port 92 of the discharge duct 90 is discharged to the space below the vehicle.

Advantages of the above-described duct assembly for a vehicle will now be described.

(1) The depression 43 of the rear bumper 40 has the panel openings 48. Each panel opening 48 is located at set back positions with respect to the upper wall section 44 above and adjacent to the depression 43 and the lower wall section 45 below and adjacent to the depression 43. Therefore, foreign matter falling from above the vehicle or flung up up from the ground is unlikely to reach the panel opening 48. Such foreign matter is thus unlikely to enter the intake duct 60 through the panel opening 48. Moreover, the panel opening 48 of the present embodiment faces obliquely rearward and downward. Therefore, foreign matter falling from above is particularly unlikely to enter the panel opening 48 as compared with a case in which the lower inclined portion 47 of the depression 43 has panel openings 48, and each panel opening 48 faces obliquely rearward and upward.

(2) When viewed from behind, the entire area of the panel opening 48 is located inside the opening of the intake port 61. Thus, most of the air flowing in from the panel openings 48 flows into the inside of the panel openings 48. Therefore, even if the air drawn in from each panel opening 48 is diffused to some extent, the air will not easily leak from between the panel opening 48 and the intake port 61. Therefore, air is efficiently supplied from the intake port 61 to the oil cooler 70.

(3) The lower part of the panel opening 48 is located forward of the intake port 61, and the intake port 61 of the intake duct 60 and the panel opening 48 of the rear bumper 40 are scarcely separated from each other in the front-rear direction. Therefore, it is unlikely that the air flowing in from the panel opening 48 will be diffused to such an extent to depart from the intake port 61 of the intake duct 60. This feature also contributes to the efficient supply of air from the intake port 61 to the oil cooler 70.

(4) The protrusion 81 protrudes downward from the lower surface of the lower cover 80. Since foreign matter in the air flow from the front to the rear is blocked by the protrusion 81, the foreign matter is unlikely to enter the discharge duct 90 through the discharge port 92. In addition, the protrusion 81 also blocks the air flow from the front when the vehicle is traveling. Therefore, while the flow of air is stagnant and the static pressure becomes high in the area forward of the protrusion 81, the air becomes thin and the static pressure becomes low in the area behind the protrusion 81. In this manner, the static pressure in the area behind the protrusion 81, that is, the static pressure in the area below the discharge duct 90 is lowered. This increases the amount of air discharged from the discharge duct 90 through the oil cooler 70 from the intake duct 60.

(5) The fins 93 are arranged inside the discharge duct 90. When foreign matter in the air flow from the front to the rear enters the discharge duct 90 through the discharge port 92, the fins 93 block entry of the foreign matter. It is thus unlikely that foreign matter will enter the oil cooler 70 through the inlet 91. Further, the fins 93 are inclined such that the lower ends are located rearward of the upper ends. Therefore, the air discharged from the discharge port 92 is likely to flow rearward along the fins 93.

(6) The rear end of the discharge duct 90 is located rearward of the front end of the lower wall section 45. This prevents, for example, foreign matter flung up by the rear wheels 10 and foreign matter stirred up by the air discharged from the discharge duct 90 from entering through between the discharge duct 90 and the rear bumper 40 to reach the intake duct 60.

The above-described embodiment may be modified as follows. The above-described embodiment and the following modifications can be combined as long as the combined modifications remain technically consistent with each other.

The rear wall 41 may have two or more depressions 43. For example, the rear wall 41 may have two depressions each located between the center and one of the opposite ends in the vehicle width direction. In this case, each depression 43 preferably has a panel opening 48.

The depression 43 does not have to be recessed forward with respect to the wall section that is below and adjacent to the depression 43 as long as the depression 43 is recessed forward at least with respect to the wall section that is above and adjacent to the depression 43. For example, if the lower wall section 45 has a depression 43, the depression 43 is recessed forward with respect to a part of the lower wall section 45 that is above the depression 43 but is not recessed with respect to a part of the lower wall section 45 that is below the depression 43.

The position of the depression 43 is not limited to the rear wall 41 of the rear bumper 40. The side wall 42 may have a depression 43 if the position of the depression 43 is rearward of the rear wheel 10. That is, the depression 43 may be provided at any position in a rear outer panel portion that is located rearward of the rear wheel 10 and constitutes a part of the outer surface of the vehicle.

The shape of the depression 43 is not limited to that in the above-described embodiment. For example, the depression 43 may have a vertical portion extending in the vertical direction between the upper inclined portion 46 and the lower inclined portion 47. Alternatively, the depression 43 may be an arcuate recess.

Each panel opening 48 may face obliquely rearward and upward. For example, if the lower inclined portion 47 of the depression 43 has a panel opening 48, the panel opening 48 will face diagonally rearward and upward. In addition, the panel opening 48 may open rearward. In a case in which the depression 43 has a vertical portion extending in the vertical direction as in the above-described modification, the panel opening 48 will face rearward if the panel opening 48 is provided in the vertical portion. In this manner, the orientation of the panel opening 48 can be changed as necessary to a direction that is likely to prevent the entry of foreign matter, taking into consideration factors such as the shape of the rear of the vehicle and air flow at the rear of the vehicle.

The shape of the intake duct 60 is not particularly limited as long as the intake port 61 opens rearward and is capable of introducing the air flowing in from the panel opening 48 of the rear bumper 40 to the oil cooler 70. For example, the cross-sectional flow area of the intake duct 60 may be uniform over the entire length or may decrease toward intake port 61. In this case, if the size of the intake port 61 is sufficiently large in relation to the size of the depression 43, the intake port 61 covers the depression 43 from the front.

The positional relationship between the intake port 61 of the intake duct 60 and the panel opening 48 in the rear bumper 40 is not limited to that in the above-described embodiment. The panel opening 48 may be located outside the intake port 61 when viewed from behind. Also, the intake port 61 of the intake duct 60 may be separated from the panel opening 48 in the front-rear direction. Even if the position of the intake port 61 of the intake duct 60 and the position of the panel opening 48 are slightly deviated or separated from each other, air will be drawn in to the intake duct 60 if the pressure in the discharge duct 90 is negative. Accordingly, the air is introduced to the intake port 61 of the intake duct 60.

The lower cover 80 does not necessarily need to have the protrusion 81. While the vehicle is traveling, air is discharged from the discharge duct 90, so that it is possible to prevent excessive foreign matter from entering the discharge duct 90 along the air flow.

The configuration of the fins 93 of the discharge duct 90 may be changed as appropriate. For example, a rib extending in the front-rear direction may be disposed at the center in the vehicle width direction of the discharge duct 90, and fins 93 may extend from the rib toward the opposite sides in the vehicle width direction. Furthermore, ribs that are arranged in the front-rear direction may be provided, and the ribs and the fins 93 extending in the vehicle width direction from the ribs may be arranged to form a grid as a whole. This configuration increases the rigidity of the fins 93.

The fins 93 do not need to be arranged in the discharge duct 90. In this case, the air discharged from the discharge port 92 flows vigorously, so foreign matter is less likely to enter the discharge duct 90 due to the flow of air below the discharge duct 90.

The shape of the discharge duct 90 may be changed as long as the discharge port 92 is opened downward, so that the air from the oil cooler 70 is discharged downward.

A filter for preventing the entry of foreign matter may be placed at the intake port 61 of the intake duct 60, in the intake duct 60, and at the discharge port 92 of the discharge duct 90.

The object to be cooled by the intake duct 60 and the discharge duct 90 may be an object other than the oil cooler 70. For example, the object to be cooled may be a driving motor, a battery, or a radiator.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A duct assembly for a vehicle, wherein
the vehicle includes
a floor panel,
two rear wheels,
an outer panel that constitutes an outer surface of the vehicle and has a rear bumper located rearward of the two rear wheels, and
an object to be cooled arranged below the floor panel,
the duct assembly comprises:
an intake duct configured to supply air outside the vehicle to the object to be cooled; and
a discharge duct configured to discharge the air supplied to the object to be cooled to an outside of the vehicle,
the discharge duct has a discharge port that opens downward,
the intake duct has an intake port that opens to behind the vehicle,
the rear bumper has a depression and an upper wall section that is above and adjacent to the depression,
the depression has a panel opening that allows passage of the air supplied to the intake port, and
the depression is recessed from the upper wall section toward a front of the vehicle.

2. The duct assembly for a vehicle according to claim 1, wherein
the rear bumper further has a lower wall section that is below and adjacent to the depression, and
the depression is recessed from the lower wall section toward the front of the vehicle.

3. The duct assembly for a vehicle according to claim 1, wherein
the depression has an inclined portion that is inclined downward toward the front of the vehicle, and
the inclined portion has the panel opening.

4. The duct assembly for a vehicle according to claim 1, wherein
an opening area of the intake port is larger than an opening area of the panel opening, and
when viewed from behind the vehicle, an entire area of the panel opening is located inside an opening of the intake port.

5. The duct assembly for a vehicle according to claim 4, wherein at least a part of the panel openings is located closer to the front of the vehicle than the intake port is.

6. The duct assembly for a vehicle according to claim 1, wherein
the vehicle further has a lower cover located below the floor panel, the lower cover being arranged to face the floor panel,
the lower cover has the discharge port and a protrusion,
the protrusion protrudes downward from an area in the lower cover that is forward of the discharge port and overlaps with the discharge port in a vehicle width direction, and
a lower end of the protrusion is located below the discharge port.

7. The duct assembly for a vehicle according to claim 1, further comprising a fin that is arranged in the discharge duct and extends in a vehicle width direction,
wherein the fin is inclined such that a lower end is closer to a rear of the vehicle than an upper end is.

8. A duct assembly for a vehicle, wherein
the vehicle includes
a floor panel,
two rear wheels,
a rear outer panel portion that is located rearward of the two rear wheels and constitutes a part of an outer surface of the vehicle, and
an object to be cooled arranged below the floor panel,
the duct assembly comprises:
an intake duct configured to supply air outside the vehicle to the object to be cooled, the intake duct having an intake port that opens rearward,
a discharge duct configured to discharge the air supplied to the object to be cooled to an outside of the vehicle, the discharge duct having a discharge port that opens downward, and
a depression that is provided in the rear outer panel portion, the depression having a panel opening that allows passage of air supplied to the intake port,
the rear outer panel portion has an upper wall section that is above and adjacent to the depression, and
the depression is recessed forward from the upper wall section.

* * * * *